United States Patent [19]

Schlegel

[11] Patent Number: 4,482,380

[45] Date of Patent: Nov. 13, 1984

[54] HARDENER FOR WATER GLASS CEMENTS

[75] Inventor: Albert Schlegel, Niedernhausen, Fed. Rep. of Germany

[73] Assignee: Hoechst Aktiengesellschaft, Frankfurt am Main, Fed. Rep. of Germany

[21] Appl. No.: 408,029

[22] Filed: Aug. 13, 1982

[30] Foreign Application Priority Data

Aug. 22, 1981 [DE] Fed. Rep. of Germany ....... 3133354

[51] Int. Cl.$^3$ .............................................. C01B 25/26
[52] U.S. Cl. .................... 106/84; 23/293 R; 23/293 A; 106/314; 423/306
[58] Field of Search ................. 423/306; 106/84, 314; 23/293 A, 293 R

[56] References Cited

U.S. PATENT DOCUMENTS

| | | | |
|---|---|---|---|
| 2,550,490 | 4/1951 | McDonald | 423/306 |
| 3,327,012 | 6/1967 | Noddings et al. | 585/632 |
| 3,445,257 | 5/1969 | Hloch et al. | 106/84 |

Primary Examiner—John Doll
Assistant Examiner—Wayne A. Langel
Attorney, Agent, or Firm—Berman, Aisenberg & Platt

[57] ABSTRACT

Aqueous solutions containing phosphate, aluminum and iron are evaporated. Thus, acidic phosphates having an atomic ratio Al:Fe of 95:5 to 5:95 and an atomic ratio P:(Al+Fe) of 1.1:1 to 3:1 are obtained. These are thermally treated by heating them in a first step to a temperature not exceeding 400° C. until their weight remains constant, and in a second step to a temperature not exceeding 750° C., likewise until their weight remains constant. The tempered phosphate so obtained is suitable as hardener for water glass cements.

11 Claims, No Drawings

HARDENER FOR WATER GLASS CEMENTS

The present invention provides an improved hardener for water glass cements.

In the construction of chemical equipment and furnaces acid-resistant water glass cements have found a wide use. These cement masses are formed of a filler that is resistant to acids or to high temperatures, for example, quartz sand, barium sulfate or chamotte, an alkali silicate, for example, soda or potash water glass, and a hardener which brings about the hardening by precipitation of a silica gel from the water glass and makes the cement resistant to water and acids. The cement mass pasted with a hardener must be processible for a sufficiently long time, and subsequently harden rapidly.

Alkali silicofluorides have been known for a long time as hardeners for water glass cements. However, these have considerable disadvantages. Under the action of an acid, these silicofluorides give off hydrogen fluoride whereby the liquids which come into contact with the linings of the apparatus are contaminated and, moreover, not only metals but also the mineral linings themselves are corroded. In the case of refractory cements containing substantially chamottes as fillers the fluorine content causes a reduction of the refractability.

German Pat. No. 1,252,835 (U.S. Pat. No. 3,445,257) describes a hardener for acid-resistant water glass cements on the basis of condensed aluminum phosphate previously subjected to a heat treatment. Suitable for hardening water glass cements are furthermore the tempered phosphates of zinc, lead, iron or magnesium as indicated in German Pat. No. 1,769,999. All these phosphate hardeners have the common disadvantage of requiring a long period of time to pass before the water glass cement lining is waterproof. This is of great importance because the user wants to start operation as soon as possible and dislikes to wait several weeks for the cement lining to become waterproof. Usually, such equipment is cleaned with water before starting the corresponding operations. The cement masses have to meet a number of other requirements in addition, for example, their pot life must be sufficiently long, but subsequently they must harden very rapidly.

The known phosphate hardeners, however, do not possess simultaneously all required properties to an optimum degree. Especially the pot life and the time which passes until the cement has become waterproof are generally rather opposed. For example, when due to the kind or the concentration of a hardener an optimal pot life of 1 to 2 hours is adjusted, the time which passes until the water resistance is achieved is about 20 days. On the other hand, if this latter period of time is adjusted to 1 to 3 days due to the kind or concentration of the hardener, this causes a simultaneous reduction of the pot life of the cement to a few minutes, which cannot be accepted at all.

It was therefore the object of the invention to provide a novel hardener which is free from the above disadvantages, and which after incorporation into the cement mass ensures a sufficiently long processing time and simultaneously the desirable reduction of the time which passes until the cement becomes waterproof.

This object is achieved by the present invention, which provides a process for the manufacture of a tempered, aluminum-containing phosphate from an acidic, aluminum-containing phosphate by thermal treatment, which comprises heating the aluminum-containing phosphate in a first step to a temperature not exceeding 400° C. until its weight remains constant, and in a second step to a temperature not exceeding 750° C., likewise until its weight remains constant. The process comprises evaporating solutions containing aluminum and iron simultaneously with the phosphate, and thermally treating the acidic phosphate so obtained having an atomic ratio Al:Fe of from 95:5 to 5:95 and an atomic ratio P:(Al+Fe) of from 1.1:1 to 3:1. These solutions may also contain insoluble components (phosphates) which are formed on preparation of the solution.

The novel condensed iron/aluminum phosphates can be manufactured batchwise or continuously, for example by means of a spray tower for evaporation, and a rotary kiln for tempering. They have optimal properties, especially a sufficiently long processing time and simultaneously a rapidly occurring water-resistance. It is essential to form the phosphate to be tempered from a solution which contains aluminum and iron simultaneously with the phosphate. Although posterior mixing of tempered aluminum phosphate and tempered iron phosphate gives crude products of identical composition, these do not possess the advantageous properties of the mixed phosphate according to the invention, for, their values are between those of the two individual components.

For the preparation of the novel tempered mixed phosphates, all compounds of iron and aluminum soluble in phosphorus, as well as the metals themselves, can be used. Suitable compounds are the oxides, hydroxides, carbonates, phosphates, chlorides, oxychlorides or nitrates.

While maintaining the indicated molar ratios, these starting substances are introduced into phosphoric acid as in the case of pure aluminum phosphate, and the common solution of the phosphates is first evaporated to dryness. Thereafter, they are subjected to the stepwise thermal treatment known from U.S. Pat. No. 3,445,257, according to which they are first heated until their weight remains constant, that is, at a temperature not exceeding 400° C. The lower limit of the temperature of treatment is at about 200° C., and depends on the composition of the iron/aluminum phosphate used. Since the condensation proceeds with water being split off, the lower temperature limit is easily determined by thermogravimetric or differential thermal analysis. Subsequently, the batch is further heated and again tempered until the weight remains constant, at a temperature not exceeding 750° C. It is recommended to maintain a temperature minimum of 400° C., preferably 500° C.

Since the thermal treatment does not essentially alter the metal oxide and phosphorus pentoxide amounts, the ratios of phosphorus pentoxide to metal oxide indicated before are valid for the starting components, the acidic phosphates, and the condensed phosphates as well. Especially preferred is an atomic ratio Al:Fe of from 25:75 to 75:25.

The final product of the thermal treatment should advantageously contain iron(III) ions only, and no iron(II) ions any more. This can be ensured by evaporating solutions in which the total iron amount is present in the form of $Fe^{3+}$, or by tempering the evaporated phosphate still containing iron(II) ions under oxidizing conditions.

Suitable for the manufacture of the cements are potash or soda water glasses, in which the ratio of $SiO_2$-

/alkali metal oxide may vary within wide limits, for example from 1.5:1 to 4:1. The cements should generally contain from 0.5 to 10 weight % of the hardener prepared according to the invention, for which purpose generally from 25 to 35 parts by weight of water glass and from 90 to 100 parts by weight of filler per 4 parts by weight of hardener are advantageous. The fillers which can be used are known to those skilled in the art, for example silicon dioxide in its various crystallographic forms, including kieselguhr, furthermore alumosilicates, such as kaolin and clays, silicon carbide, corundum, or heavy spar. The choice of the filler or filler mixture depends on the application field of the water glass cement.

The following examples illustrate the invention.

COMPARATIVE EXAMPLE 1

A mixture of 232.3 g of $H_3PO_4$ (82% strength) and 62 ml of water is heated to 60° C., and then 62.4 g of Al(OH)$_3$ are strewed in with stirring. The reaction being complete, the solution is flaked by means of a roll heated to about 200° C.

Subsequently, the material is heated to 200° C. in a stove through which a small amount of air is passed, and maintained at this temperature for a further 2 hours. The batch is then heated to 450° C. within 2 hours, and the temperature is maintained for a further hour. After cooling, the product is finely ground in a mortar.

A water glass cement manufactured therewith is waterproof after 16 days.

COMPARATIVE EXAMPLE 2

A mixture of 549 g of $H_3PO_4$ (82% strength) and 350 ml of water is preheated to 60° C. Subsequently, 111.7 g of metallic iron in powder form is strewed in portionwise with stirring, while waiting for the gas development to cease each time before adding a further portion. The solution containing already a small amount of solid iron phosphate in suspended form is then heated to 90° C., and flaked by means of a roll having a temperature of about 200° C. The atomic ratio $Fe^{3+}:Fe^{2+}$ of the rolled product was about 9:1. Subsequently, the material is heated to 200° C. in a stove through which a small amount of air is passed, and maintained for 2 hours at this temperature. Within a further 2 hours, the batch is heated to 500° C., and tempered for 1 hour at this temperature. After cooling, the product is finely ground in a mortar.

A water glass cement manufactured therewith is waterproof after 12 days only.

COMPARATIVE EXAMPLE 3

100 parts by weight of the tempered aluminum phosphate of Comparative Example 1 and 100 parts by weight of the tempered iron phosphate of Comparative Example 2 are mixed and ground for 5 minutes in a ball mill. A water glass cement manufactured with the use of this mixed phosphate is waterproof after 13 days only.

EXAMPLE

A mixture of 549 g of $H_3PO_4$ (82% strength) and 100 ml of water is heated to 60° C., and 55.9 g of metallic iron in powder form is then strewed in portionwise, while waiting each time for the gas development to cease before adding a further portion. Subsequently, 78 g of Al(OH)$_3$ pasted with 100 ml of water are added with stirring, and the mixture is then maintained at 100° C. for one hour. Thereafter, the material is flaked by means of a roll heated at about 200° C.

Subsequently, the product is heated to 200° C. in a stove through which a small amount of air is passed, and this temperature is maintained until the weight of the product remains constant. Within 2 hours, the batch is heated to 500° C., and tempered for 1 hour at this temperature until the weight remains constant. After cooling, the material is finely ground in a mortar.

A water glass cement manufactured with the use of this mixed phosphate is completely waterproof after one day already. For the manufacture of the cement masses, 34 g each of potash water glass (molar ratio $SiO_2:K_2O = 2.9:1$), 96 g of quartz sand and 3.8 g of the tempered phosphate hardener were mixed. Several cylindrical test specimens (diameter and height 25 mm each) were shaped and abandoned for hardening. At intervals of 1 day each, the resistance to water was determined by immersion in water. Waterproof specimes did not disintegrate any more. The processing time was in all cases 1 to 2 hours.

What is claimed is:

1. A process for the manufacture of a tempered phosphate from an acidic, iron-aluminum-containing phosphate by thermal treatment, which comprises heating the iron-aluminum-containing phosphate, in a first step, to a temperature not exceeding 400° C. until its weight remains constant and, in a second step, to a temperature not exceeding 750° C., until its weight remains constant wherein a solution containing aluminum and iron simultaneously with the phosphate is evaporated and the acidic phosphate so obtained, having an atomic ratio Al:Fe of from 95:5 to 5:95 and an atomic ratio P:(Al+Fe) of from 1.1:1 to 3:1, is thermally treated.

2. Hardener for water glass cement which imparts to a water glass cement composition a pot life of from 1 to 2 hours and renders the composition waterproof in 1 day, the hardener comprising thermally-tempered condensed iron/aluminum phosphates having an atomic ratio of Al:Fe of from 95:5 to 5:95 and an atomic ratio of P:(Al+Fe) of from 1.1:1 to 3:1.

3. Hardener according to claim 2 wherein the iron is entirely in $Fe^{3+}$ form.

4. Hardener according to claim 2 or claim 3 wherein the ratio of Al:Fe is from 25:75 to 75:25.

5. A water glass composition comprising hardener and filler and wherein the hardener is hardener according to claim 2.

6. A water glass composition according to claim 5 comprising from 0.5 to 10 percent by weight of hardener.

7. A water glass composition according to claim 6 having from 25 to 35 parts by weight of water glass and from 90 to 100 parts by weight of filler.

8. A process for manufacturing tempered aluminum-containing phosphate by thermal treatment which comprises:
   (a) evaporating a solution containing aluminum, iron and phosphate to obtain an acidic phosphate having an atomic ratio Al:Fe of from 95:5 to 5:95 and an atomic ratio P:(Al+Fe) of from 1.1:1 to 3:1,
   (b) heating the acidic phosphate to a temperature which is at least about 200° C. and not exceeding 400° C. until its weight remains constant and
   (c) heating the product by step (b) to a temperature which is at least 400° C. and not exceeding 750° C. until its weight remains constant.

9. A process according to claim 8 wherein the atomic ratio Al:Fe is from 75:25 to 25:75.

10. In a process for incorporating an effective amount of hardener in a water glass cement, the improvement wherein the hardener is tempered aluminum-containing phosphate obtained according to the process of claim 8.

11. In a process for incorporating an effective amount of hardener in a water glass cement, the improvement wherein the hardener is hardener according to claim 2.

* * * * *